United States Patent [19]

Sasaki et al.

[11] 4,357,101

[45] Nov. 2, 1982

[54] MECHANISM FOR SUPPORTING AN ORIGINAL DOCUMENT COVER LID OF AN ELECTROSTATIC COPYING APPARATUS

[75] Inventors: Koichi Sasaki, Osaka; Yasuji Sumida, Nara; Hiroshi Ishida, Ibaragi, all of Japan

[73] Assignee: Mita Industrial Company Limited, Osaka, Japan

[21] Appl. No.: 171,536

[22] Filed: Jul. 23, 1980

Related U.S. Application Data

[62] Division of Ser. No. 29,053, Apr. 11, 1979, Pat. No. 4,295,731.

[30] Foreign Application Priority Data

| | | | |
|---|---|---|---|
| Apr. 17, 1978 | [JP] | Japan | 53-45490 |
| Apr. 17, 1978 | [JP] | Japan | 53-50972[U] |
| Apr. 17, 1978 | [JP] | Japan | 53-50973[U] |
| Apr. 19, 1978 | [JP] | Japan | 53-47309 |
| May 23, 1978 | [JP] | Japan | 53-61822 |
| May 23, 1978 | [JP] | Japan | 53-70043[U] |
| May 23, 1978 | [JP] | Japan | 53-70044[U] |
| May 23, 1978 | [JP] | Japan | 53-70045[U] |
| May 23, 1978 | [JP] | Japan | 53-70046[U] |
| May 23, 1978 | [JP] | Japan | 53-70047[U] |
| May 30, 1978 | [JP] | Japan | 53-65949 |
| May 30, 1978 | [JP] | Japan | 53-74580[U] |
| May 30, 1978 | [JP] | Japan | 53-74581[U] |
| May 30, 1978 | [JP] | Japan | 53-74582[U] |
| May 31, 1978 | [JP] | Japan | 53-66119 |

[51] Int. Cl.³ .................... G03B 27/62

[52] U.S. Cl. .................... 355/75; 355/3 R

[58] Field of Search .................... 355/3 R, 75, 76, 133

[56] References Cited

U.S. PATENT DOCUMENTS

| | | | |
|---|---|---|---|
| 2,545,964 | 3/1951 | Maxwell | 355/76 |
| 3,615,134 | 10/1971 | Newcomb | 355/75 |
| 4,040,615 | 8/1977 | Kurosaki | 355/76 X |
| 4,124,296 | 11/1978 | Kishi et al. | 355/75 |
| 4,135,805 | 1/1979 | Taylor et al. | 355/3 R |
| 4,171,906 | 10/1979 | Yoshida et al. | 355/75 |
| 4,172,660 | 10/1979 | Yanofsky et al. | 355/75 |
| 4,190,359 | 2/1980 | Murayama et al. | 355/75 |

OTHER PUBLICATIONS

*Xerox Disclosure Journal,* "Torsion Spring Counterbalance Mechanism," Ritter, p. 71, vol. 3, No. 1, Jan.-/Feb.'78.

*Primary Examiner*—Richard L. Moses

*Attorney, Agent, or Firm*—Wenderoth, Lind & Ponack

[57] ABSTRACT

A mechanism for supporting a cover lid, particularly an original document cover lid of an electrostatic copying apparatus, includes a generally U-shaped support member for supporting the cover lid. A pair of arms of the support member are fixed to a pair of hinge members which are mounted on the machine frame for rotation about an axis. Support pieces are fixed to the hinge members for rotation therewith about the axis. First springs are connected to the support pieces for urging the hinge members, the support member and the cover lid to rotate about the axis in a first direction toward an open position of the cover lid. A revolving plate is pivotally mounted on the machine frame, and a support bar is fixed to one of the hinge members and extends into an elongated opening of the revolving plate, such that rotation of the hinge members around the axis causes the support bar to pivot the revolving plate between first and second positions. An oscillating lever mounted on the machine frame has a projection fitting into the notch when the revolving plate is in the first position and the cover lid is in the open position, such that the projection maintains the cover lid in the open position. A second spring biases the projection against an arc-shaped surface of the revolving plate when the cover lid is moved from the open position toward a closed position thereof.

3 Claims, 9 Drawing Figures

MECHANISM FOR SUPPORTING AN ORIGINAL DOCUMENT COVER LID OF AN ELECTROSTATIC COPYING APPARATUS

This is a division of application Ser. No. 29,053, filed Apr. 11, 1979 now U.S. Pat. No. 4,295,731.

BACKGROUND OF THE INVENTION

Field of the Invention

The present invention relates to a mechanism for supporting a cover lid of the type movable between a closed position covering a surface of the machine frame and an open position spaced from the surface. The present invention particularly is directed to such a mechanism for supporting an original document cover lid of an electrostatic copying apparatus.

SUMMARY OF THE INVENTION

In accordance with the present invention there is provided a mechanism whereby a cover lid, particularly an original document cover lid of an electrostatic copying apparatus, may be fixedly maintained in an open position of the cover lid.

More particularly, the present invention provides such a mechanism including biasing structure to enable even a very heavy cover lid to be moved between open and closed positions thereof with only a relatively slight manual effort.

BRIEF DESCRIPTION OF THE DRAWINGS

A detailed description of the invention now will be made with reference to the accompanying drawings wherein like numerals designate corresponding parts and wherein.

DETAILED DESCRIPTION OF THE INVENTION

Figure 1:
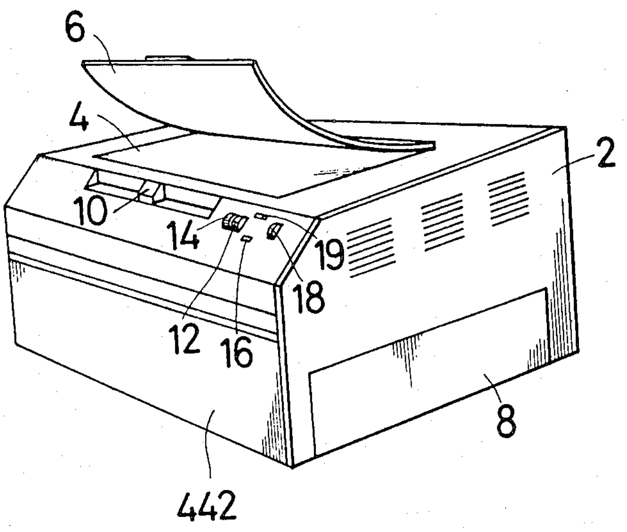
FIG. 1 is a perspective view of an electrostatic copying apparatus incorporating the features of the present invention.

FIG. 1 is a perspective view of an electrostatic copying apparatus according to this invention. A top machine frame 2 is provided with a transparent plate 4 for supporting thereon an original document to be copied. The machine frame 2 is equipped with an original document cover lid 6 which presses the original document upon the transparent plate 4. A copying paper feed device 8 which supplies a roll-like photosensitive copying paper is assembled into the machine frame 2 as illustrated in FIG. 1. This paper feed device 8 can be drawn out from the machine frame 2 in the rightward direction as viewed in FIG. 1. The length of copying paper discharged from the machine frame 2 upon completion of copying can be freely selected by sliding a knob 10, which projects from the front of the machine frame 2, manually in the lateral direction of the machine frame 2, and the length corresponds to the selected position of knob 10. The number of copies to be taken can be preset by two-digit display drums 12 and 14 provided in the upper front part of the machine frame 2. In a copying operation, first the number of copies is set by display drums 12 and 14, then a print button 16 is pressed. The contrast of picture appearing on the copying paper can be adjusted by a rotatable knob 18. If the copying paper jams within a apparatus, the jamming alarm lamp 19 will light up.

The present invention particularly is directed to a mechanism for supporting original document cover lid 6.

Figure 2:
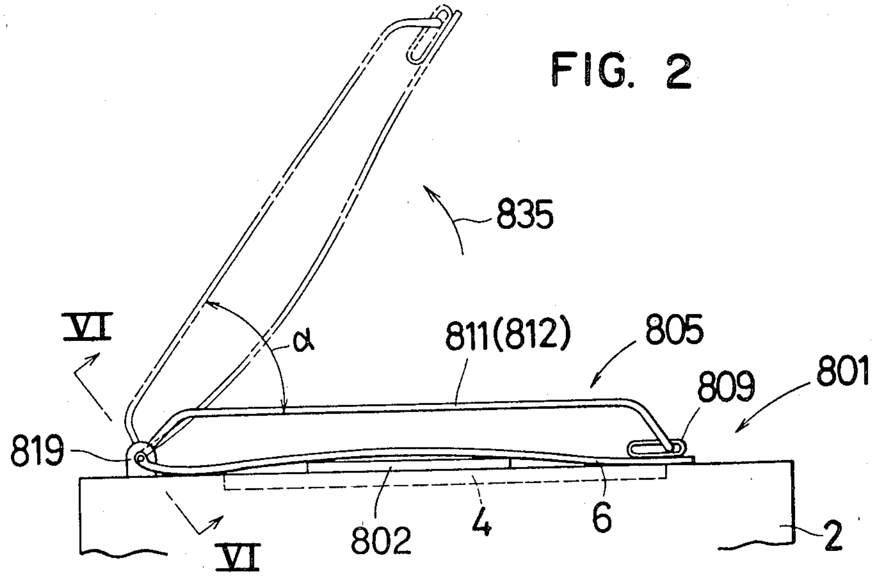
FIG. 2 is a side view of the mechanism for supporting an original document cover lid shown in FIG. 1.
Figure 3:
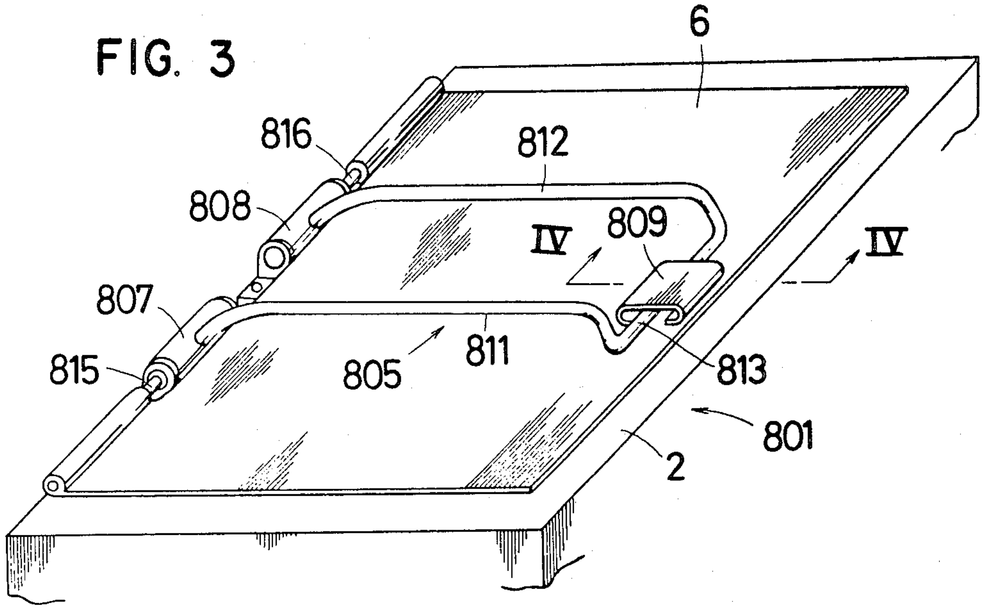
FIG. 3 is a perspective view of the structure shown in FIG. 2.
Figure 4:
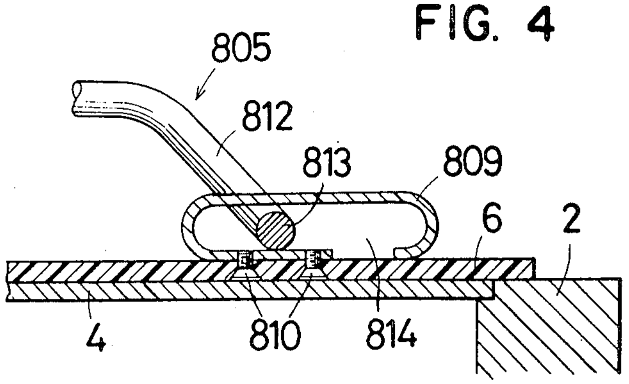
FIG. 4 is a sectional view taken along a line IV—IV of FIG. 3.

FIG. 2 is a side view of the original document cover lid 6; FIG. 3 is a perspective view thereof, and FIG. 4 is a sectional view along line IV—IV of FIG. 3. The electrostatic copying apparatus 801 is designed to move part of a optical device (not shown) horizontally in the crosswise direction of the copying apparatus (perpendicular to the plane of FIG. 2) to transfer the image of the original onto the moving paper through slit exposure. Above the machine frame 2 is installed the transparent plate 4 to support the original document. Beneath the transparent plate 4 is provided a part of the movable optical device. The original document put on the transparent plate 4 is covered with the original document cover lid 6 made of, e.g., rubber, which is supported by a support member 805. This support member 805 is attached to hinges 807 and 808 provided at the end of the rear side (the left side in FIG. 2) of the machine frame 2. Thus, the support member 805 can be moved to an open position, as shown by the dotted line in FIG. 2, by revolving upwards from the transparent plate 4 within the range of a revolving angle $\alpha$, for instance, 45 degrees.

In the upper near or front part of the original document cover lid 6 is screwed by screws 810 a mounting member 809 functioning as a handle. The mounting member 809 is bent in an arc form at both ends to extend along the original document cover lid 6 at right angles to the crosswise direction of the machine frame 2. The support member 805 is formed roughly in a U-shape with arms 811 and 812 curving upwards and having a round cross section, and a connecting piece 813 having a round cross section joining arms 811 and 812 together. The support member 805 should have a relatively large diameter in the case of a large-sized copying apparatus to sufficiently support the original document cover lid 6. The connecting piece 813 is fitted to the mounting member 809 in a manner allowing piece 813 to move freely in the longitudinal direction of the machine frame 2 within the mounting member 809. The end part of mounting member 809 situated at the side of original document cover lid 6 and not connected by the screws 810 provides a gap 814 for inserting the connecting piece 813. The gap 814 is shut off by the flexible original document cover lid 6. As shown in FIG. 2, if the original 802 is bulky, such as a book, since the connecting piece 813 of the support member 805 can be moved along the mounting member 809, the original document cover lid 6 can be bent along the contour of the original 802. Thus, the original 802 is covered so that no light leaks from the optical device. When the support member 805 is revolved upwards, the mounting member 809 is allowed to move along the connecting piece 813 due to the gravity of the cover lid 6, so that the connecting piece 813 comes in contact with the end of the arc form of the mounting member 809. Thereby, the connecting piece 813 will not drop off through the gap 814. The free ends of the arms 811 and 812 are connected to the hinges 807 and 808, respectively. The rear end of the cover lid 6 is supported by revolving shafts 815 and 816, which are, in turn, fitted into the hinges 807 and 808 on the same axial line.

Figure 5:
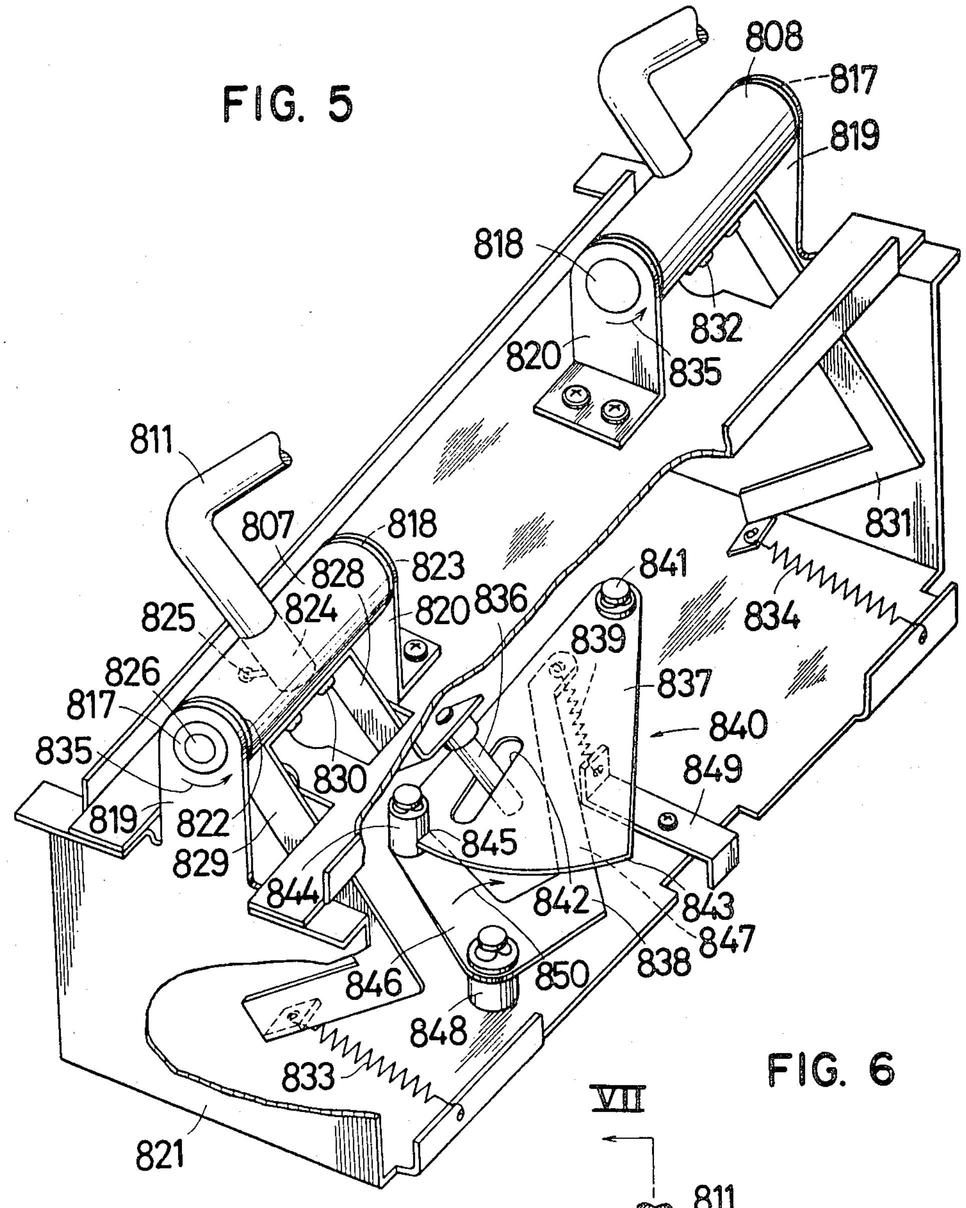
FIG. 5 is a perspective view showing mechanism for revolving and holding the original document cover lid.
Figure 6:
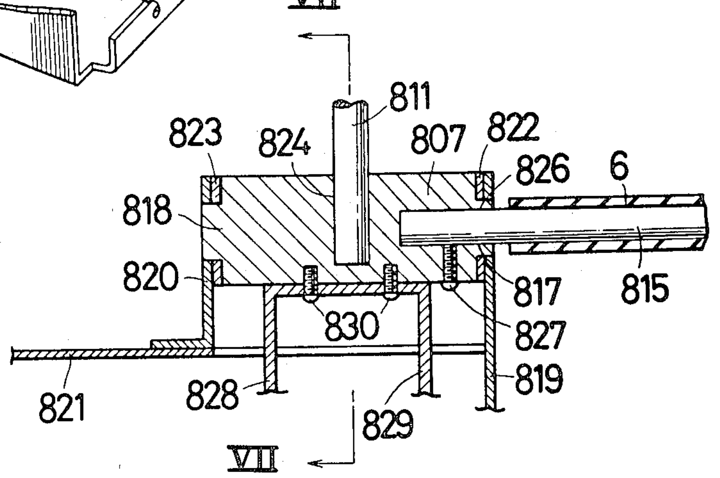
FIG. 6 is a sectional view taken along line VI—VI in FIG. 2.
Figure 7:
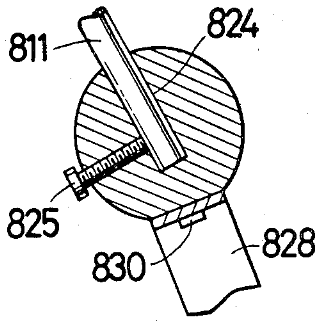
FIG. 7 is a sectional view taken along line VII—VII in FIG. 6.

FIG. 5 is a perspective view of the mechanism to revolve and hold the original document cover lid 6 which is mounted on the support member 805. FIG. 6 is a sectional view VI—VI in FIG. 2. FIG. 7 is a sectional view VII—VII in FIG. 6. The hinges 807 and 808 having round cross sections are provided with projections 817 and 818 having round cross sections and projecting outward in the axial direction. The projections 817 and 818 of the hinges 807 and 808 are rotatably fitted to a pair of brackets 819 and 820. The brackets 819 and 820 are in one body with a support mechanism 821 located in the rear side of the machine frame 2. Between the hinges 807, 808 and the brackets 819, 820 are inserted sliding rings 822 and 823 having a small coefficient of friction in order to enable the hinges to revolve smoothly. In the central part along the axial line of hinge 807, a fitting hole 824 to accept one arm 811 of the support member 805 is formed through the midpoint of the diameter of hinge 807. The position of the fitting hole 824 is selected so that the original document cover lid 6 is opened 45 degrees when the hinge 807 is moved to the maximum angle as shown in FIG. 5, and that the original document cover lid 6 is placed on the transparent plate 4 when the hinge 807 is not rotated. The arm 811 inserted into the fitting hole 824 is fixed by screw 825. In the projection 817 extending outwards in the axial direction of the hinge 807 is formed a fitting hole 826 for inserting revolving shaft 815 up to the a mid-portion of the length in the axial direction of the hinge 807. The revolving shaft 815 fitted into the fitting hole 826 is secured by screw 827. The other hinge 808 is formed in a manner similar to the hinge 807, and the other arm 812 of the support member 805 and the revolving shaft 816 are inserted and secured in the same manner.

In the lower part of the hinge 807 are attached support pieces 828 and 829, by means of screws 830. Pieces 828 and 829 extend at right angles to the rotational axial line of the hinge 807 and in the downward direction penetrating through the main body 821 towards the front side of the machine frame 2. These support pieces 828 and 829 are arranged parallel to each other at proper intervals in the axial direction of the hinge 807. The outward support piece 829 in the axial direction of the hinge 807 is bent towards the rear side of the machine frame 2. In the outward lower part in the axial direction of the other hinge 808, a support piece 831 is attached by means of screws 832. The support piece 831, like 829, is formed roughly in an L-shape, and extends towards the front side of the machine frame 2. At the free ends of the support pieces 829 and 831 are attached ends of springs 833 and 834, the other ends of which are connected to the front side of the body 821. By the force of springs 833 and 834, the support pieces 829 and 831 are made biased or urged toward the front side of the machine frame 2. Therefore, the hinges 807 and 808 are biased to rotate in the direction of arrows 835.

One end of a stopping bar 836 having a round cross section is attached to the free end of the support piece 828 of the hinge 807. The stopping bar 836 slopes downwards in the extended direction of the support piece 828. Underneath the stopping bar 836 are provided a revolving plate 837 having a generally sector shape, an oscillating lever 838 located below revolving plate 837, and a spring 839 which urges the oscillating lever 838 to a side of revolving plate 837. These three elements form a supporting member 840. The revolving plate 837 is rotatably mounted at the apex of the sector thereof by a pin 841 and has an elongated hole 842 which extends in the radial direction. The free end of the stopping bar 806 is inserted into this oval hole 842. An arc-shaped surface or edge 843 of the revolving plate 837 has formed in a side thereof, toward the rear side of the main body 821 a semicircular notch 845 for the insertion of a pin or rotor 844 which is mentioned later. Below the revolving plate 837 is horizontally positioned the oscillating lever 838 which is equipped with two arms 846 and 847. The oscillating lever 838 is free to rotate horizontally and is supported by means of pin 848 attached to the main body 821 at the base of arms 846 and 847 at a position outside the radial dimension of the revolving plate 837. The rotor 844 projecting higher than the revolving plate 837 is rotatably fitted to the free end of one arm 846 which extends roughly along the arc-shaped edge 843 of the revolving plate 837. The other arm 847 extends beneath the revolving plate 837 at the opposite side of the arm 846 with respect to the elongated hole in the revolving plate 837. The free end of the arm 847 is fitted to one end of spring 839 the other end of which is fixed to a support piece 849 connected to the body 821. By the force of the spring 839, the oscillating lever 838 is urged in the direction of arrow 850. Thus, the rotor 844 is urged into contact with the arc-shaped edged 843 of the revolving plate 837.

As shown in FIG. 2, when the original 802 is covered with the original document cover lid 6, the hinges 807 and 808 are rotated in the direction reverse to the arrows 835, against the force of the springs 833 and 834, by gravity due to the weight of the support member 805 and the cover lid 6. Thus, the force to revolve the hinges 807 and 808 in the direction of arrows 835 using the force of the springs 833 and 834 is selected to be a little smaller than the force to rotate the hinges 807 and 808 in the direction reverse to the arrows 835 by gravity due to the weight of the support member 805 and the cover lid 6. Therefore, unless the support member 805 is moved upwards with a slight force in addition to springs 833 and 834, it will not be pushed up only by the force of the springs 833 and 834.

Figure 8:
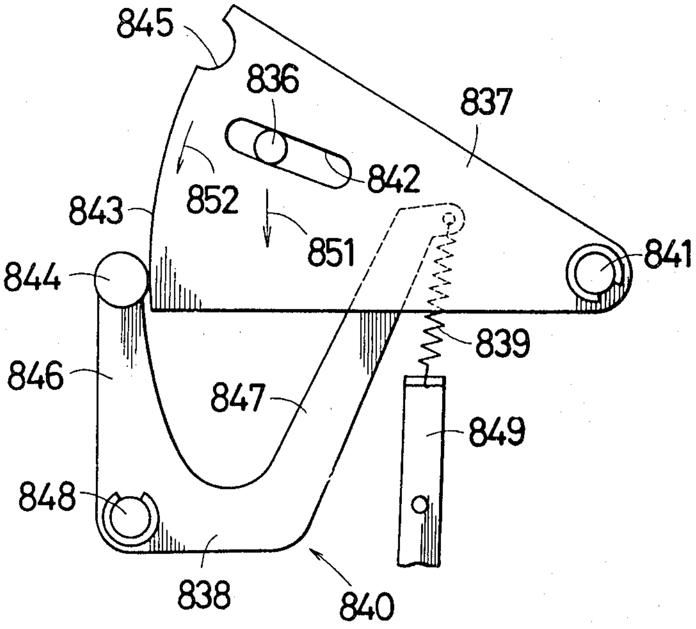
FIGS. 8 and 9 are plan views showing a supporting member 6 for the original document cover lid.

While the original document cover lid 6 is covering the transparent plate 4, the stopping bar 836 is revolved in the direction reverse to the arrows 835, together with the hinge 807, due to which the revolving plate 837 is also revolved towards the rear side of the main body 821 as shown in FIG. 8. Hence, the rotor 844 urged toward the arc-shaped edge 843 by means of spring 839 is positioned frontwardly of and spaced from notch 845.

Figure 9:
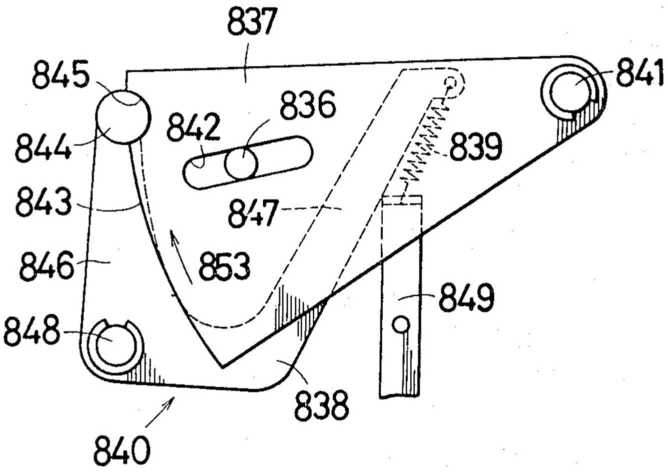

When revolving the original document cover lid 6 upwards in order to place the original document 802 on the transparent plate 4, the support member 805 is pushed up by hand. At this time, since the support pieces 829 and 831 and hinges 807 and 808 are pulled in the direction of the arrows 835 by springs 833 and 834, the support member 805 and the original document cover lid 6, even when they are heavy, can be moved with a slight manual force. The revolution of the support member 805 in the direction of the arrow 835 causes the stopping bar 836 to turn in the direction of arrow 851 (FIG. 8). In turn, the rotation of stopping bar 836 causes the revolving plate 837 to revolve around the pin 841 in the direction of the arrow 852. Consequently, the arc-shaped edge 843 of the revolving plate 837 moves in contact with the rotating rotor 844. When the support member 805 is turned by $\alpha$ degrees, the rotor 844 fits into the notch 845 in the arc-shaped edge 843 as shown in FIG. 9. As a result, the support member 805 is fixed at the maximum revolving position of angle $\alpha$, so that the original document cover lid 6 will not return in the direction reverse to the arrows 835 even if the support member 805 is released.

To cover the original again with the cover lid 6 when the support member 805 is fixed at the maximum revolving position, the support member 805 should be turned in the direction reverse to the arrows 835 by hand, against the force of the springs 833 and 834. Then, the revolving plate 837 is permitted to turn in the direction of arrow 853 in FIG. 9. As a consequence, the rotor 844 is released from the notch 845 in FIG. 9, and slides along the arc-shaped edge 843 to return to the original position shown in FIG. 8.

Since it is apparent that many changes could be made in the above construction and many widely different embodiments of the invention could be made without departing from the scope thereof, it is intended that all matter contained in the above description or shown in the accompanying drawings shall be interpreted as illustrative and not in a limiting sense.

What is claimed is:

1. A mechanism for supporting a cover lid of the type movable between a closed position covering a surface of a machine frame and an open position spaced from the surface, said mechanism comprising:

a generally U-shaped support member for supporting a cover lid, said support member including a pair of arms;

hinge members adapted to be mounted on a machine frame for rotation about an axis;

said arms being fixed to said hinges, such that said support member and the cover lid are pivotable with said hinge members about said axis between closed and open positions of the cover lid;

support pieces fixed to said hinge members for rotation therewith about said axis;

first biasing means connected to said support pieces for urging said hinge members, said support member and the cover lid to rotate about said axis in a first direction toward the open position of the cover lid;

a revolving plate adapted to be pivotally mounted on the machine frame, said revolving plate having an arc-shaped edge having therein a notch, said revolving plate further having therein an alongated opening;

a support bar fixed to and extending from one of said hinge members into said elongated opening, such that rotation of said hinge members about said axis causes said support bar to pivot said revolving plate between first and second positions;

an oscillating lever adapted to be pivotally mounted on the machine frame, said oscillating lever having projection means positioned to fit in said notch when said revolving plate is in said first position and said hinge members, said support member and the cover lid are in the open position, for maintaining said hinge members, said support member and the cover plate in the open position;

whereby manual rotation of said hinge members, said support member and the cover lid in a second direction toward the closed position of the cover lid causes said supporting bar to pivot said revolving plate toward said second position, thereby forcing said projection means out of said notch and onto said arc-shaped edge; and second biasing means for urging said oscillating lever toward said revolving plate and thereby for urging said projection means toward said arc-shaped edge.

2. A mechanism as claimed in claim 1, wherein said first biasing means comprises springs having first ends connected to said support pieces and second ends adapted to be connected to the machine frame.

3. A mechanism as claimed in claim 1, wherein said oscillating lever includes first and second arms, said projection means being on said first arm, and said second biasing means comprises a spring having a first end connected to said second arm and a second end adapted to be connected to the machine frame.

* * * * *